Nov. 26, 1963  G. R. ANDERSON ETAL  3,111,972
FRUIT PREPARATION MACHINE
Filed March 14, 1960  7 Sheets-Sheet 1
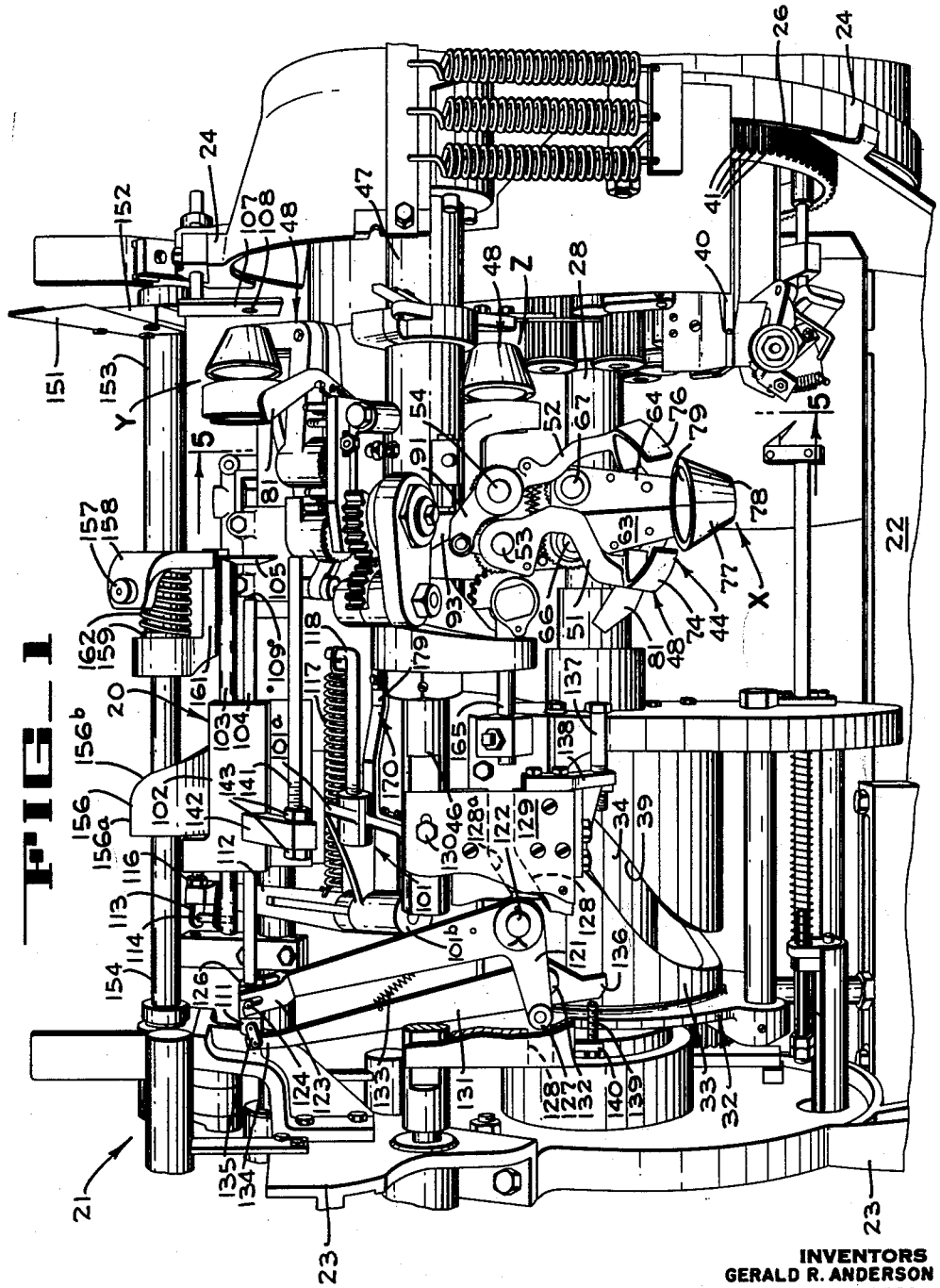
INVENTORS
GERALD R. ANDERSON
SHERMAN H. CREED
RALPH G. GARDINER
BY Hans G. Hoffmeister
ATTORNEY

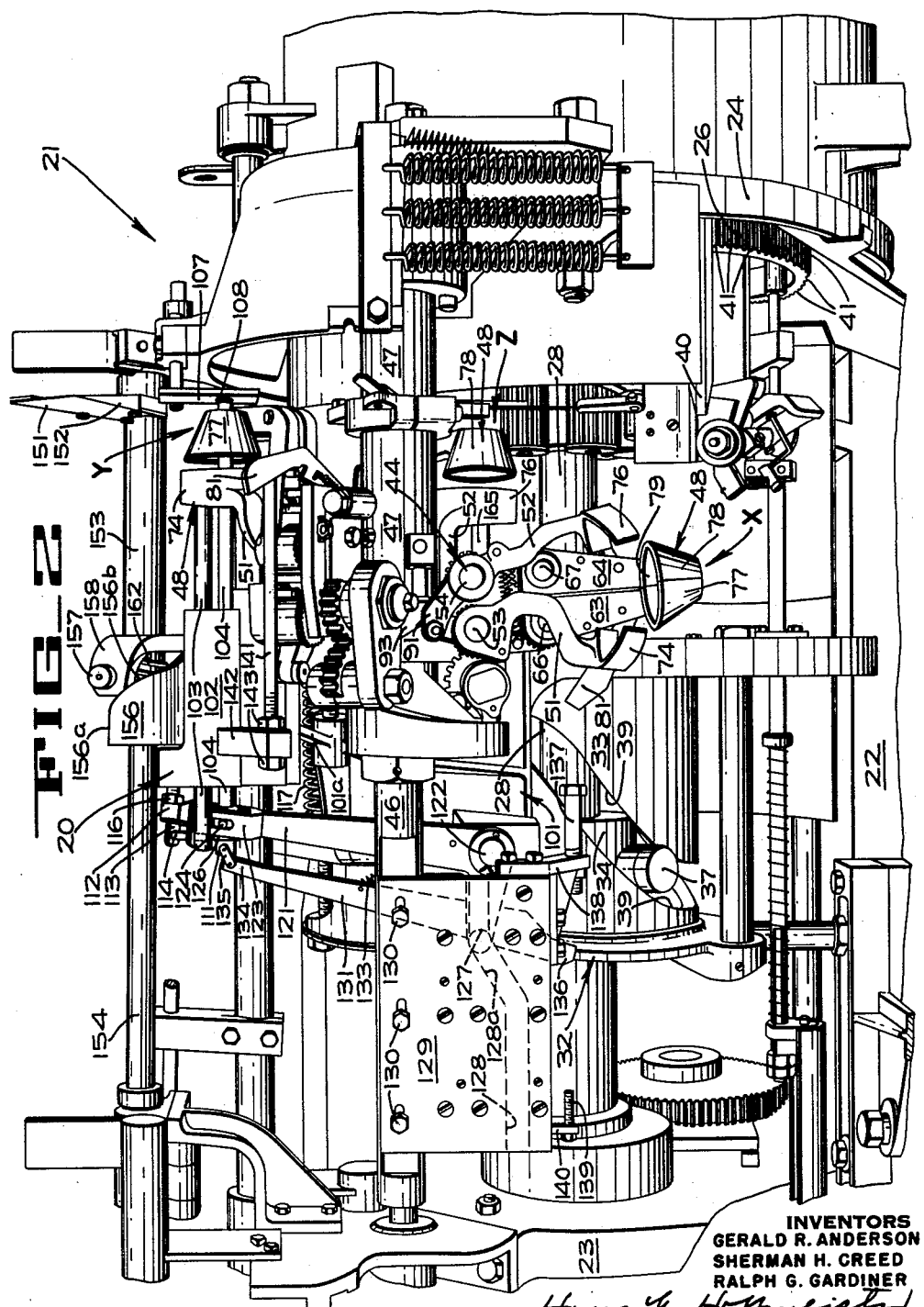

Nov. 26, 1963   G. R. ANDERSON ETAL   3,111,972
FRUIT PREPARATION MACHINE
Filed March 14, 1960   7 Sheets-Sheet 3
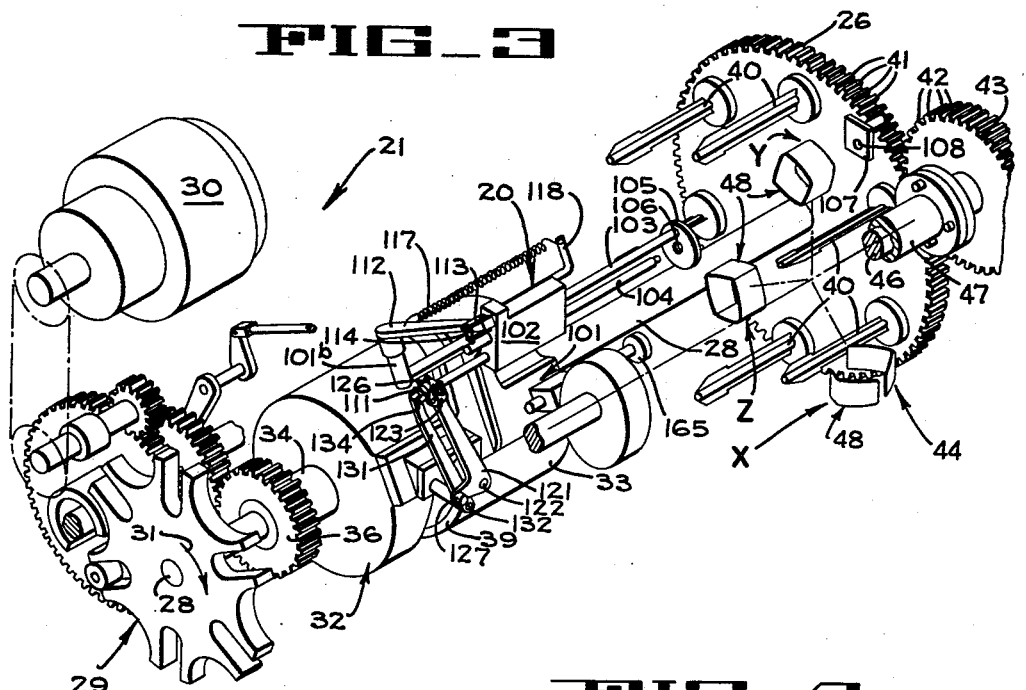
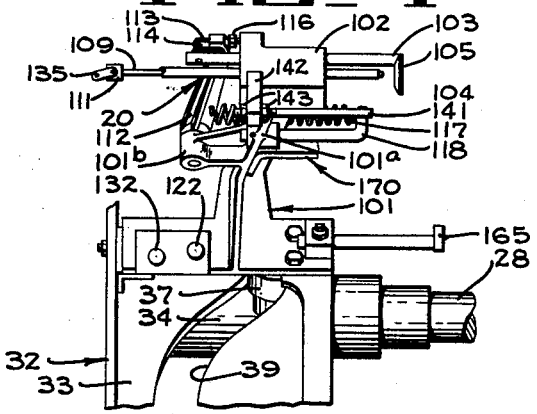
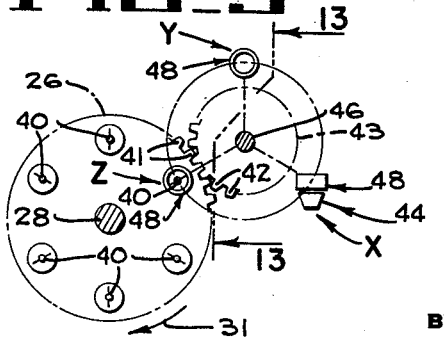
INVENTORS
GERALD R. ANDERSON
SHERMAN H. CREED
RALPH G. GARDINER
BY Hans G. Hoffmeister
ATTORNEY

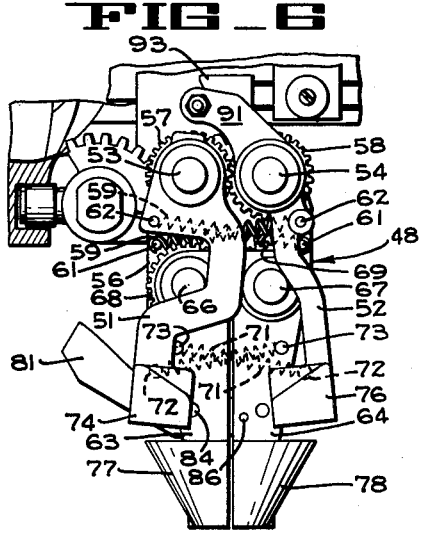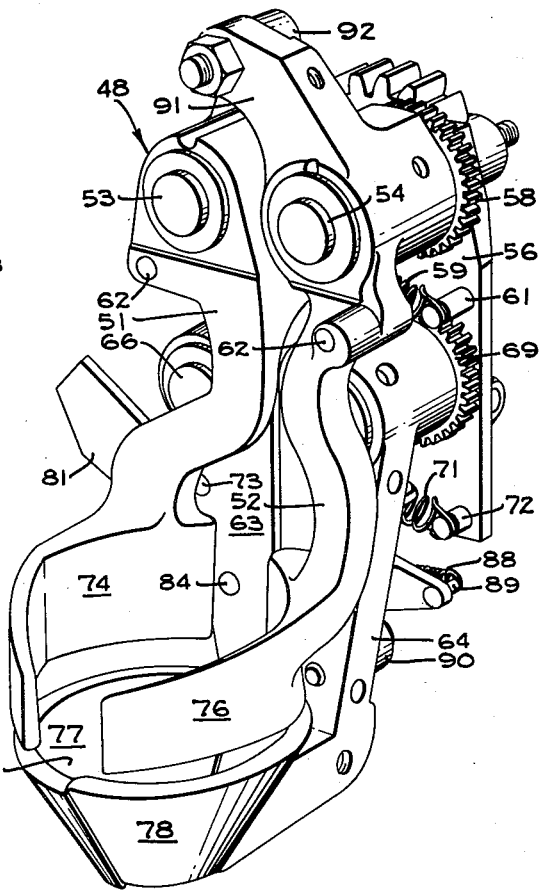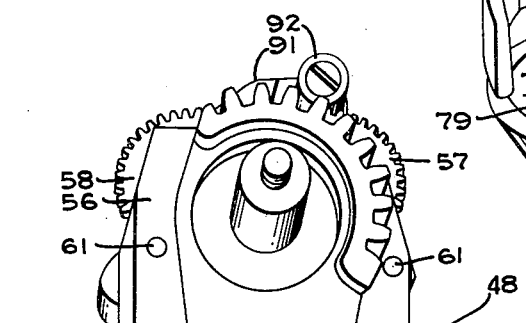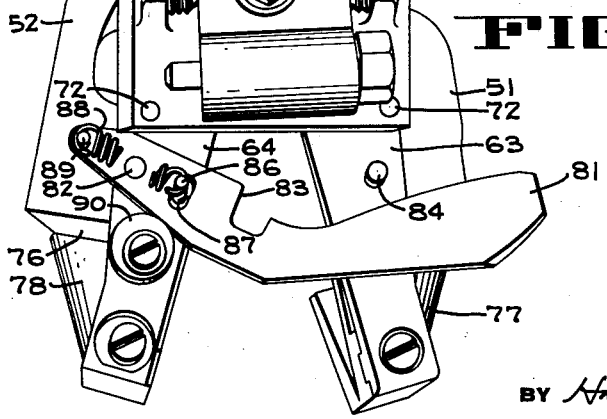

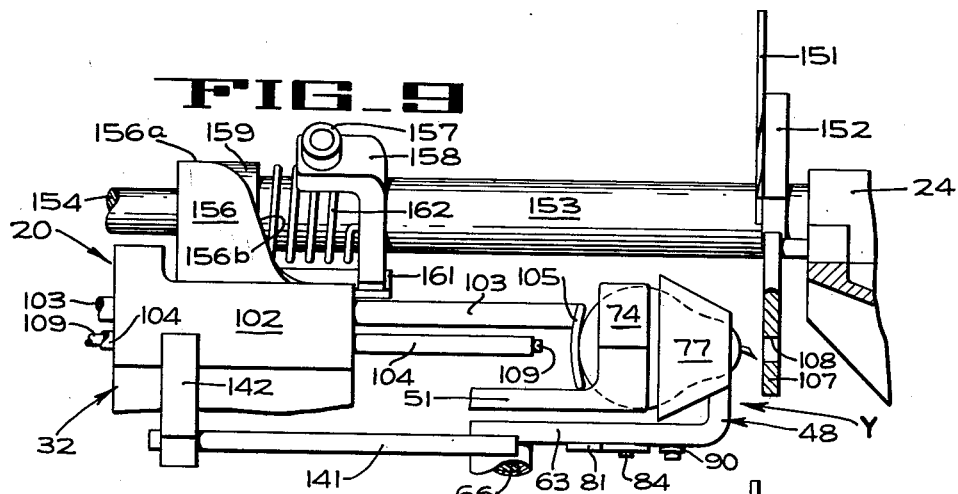
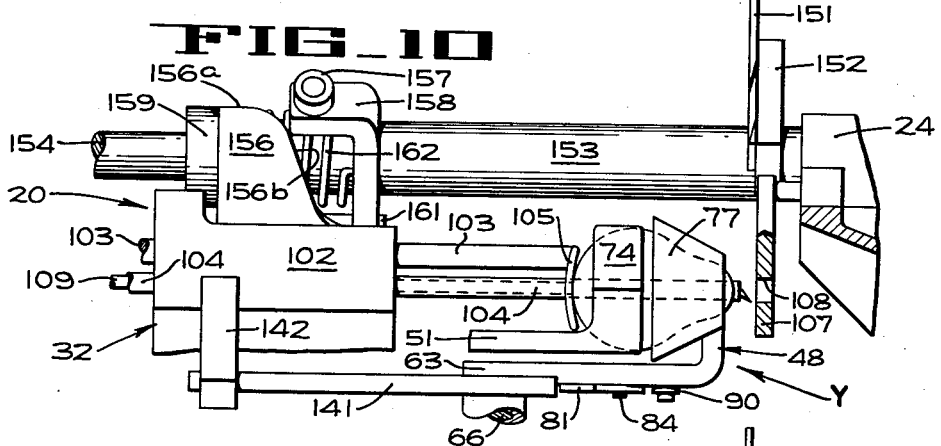
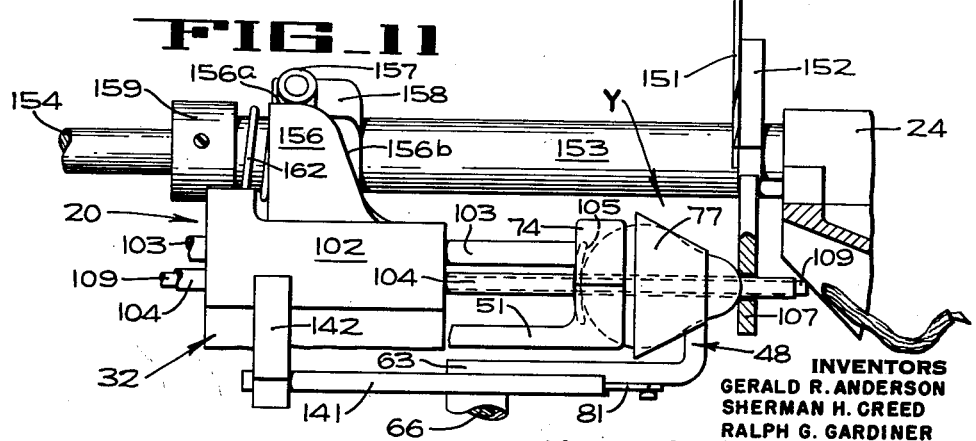

Nov. 26, 1963
G. R. ANDERSON ETAL
3,111,972
FRUIT PREPARATION MACHINE
Filed March 14, 1960
7 Sheets-Sheet 6
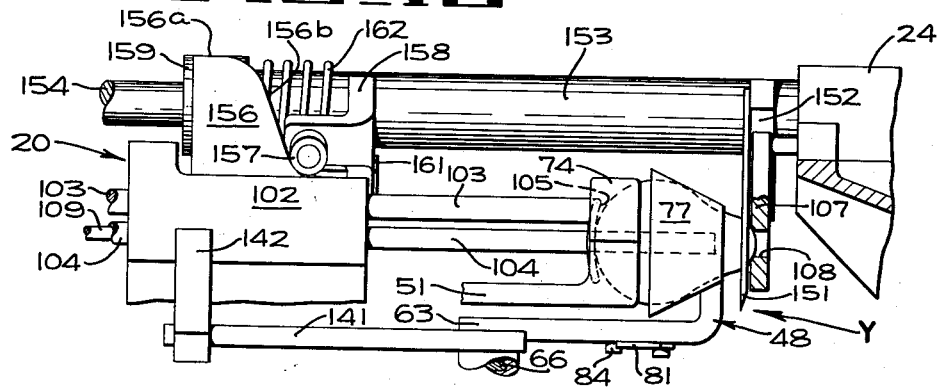
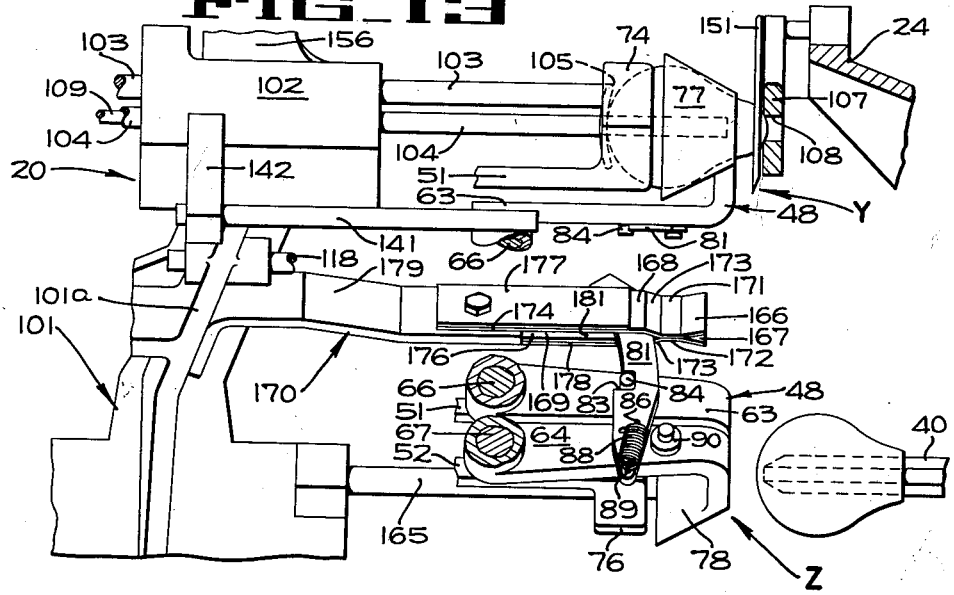
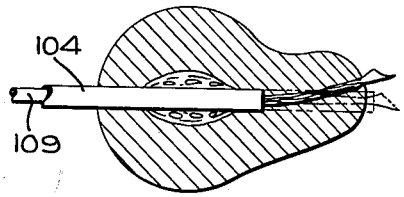
INVENTORS
GERALD R. ANDERSON
SHERMAN H. CREED
RALPH G. GARDINER
BY *Hans G. Hoffmeister*
ATTORNEY

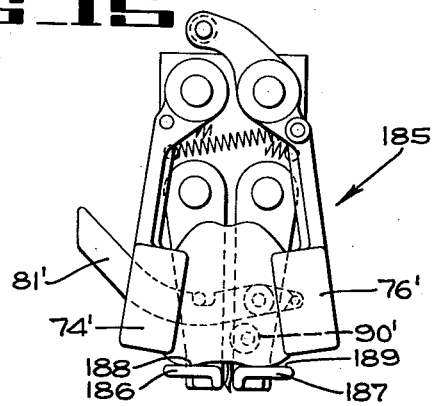
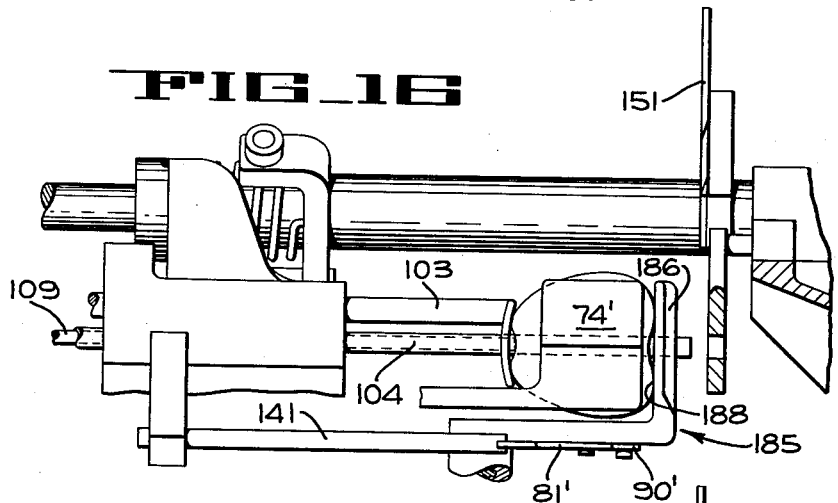
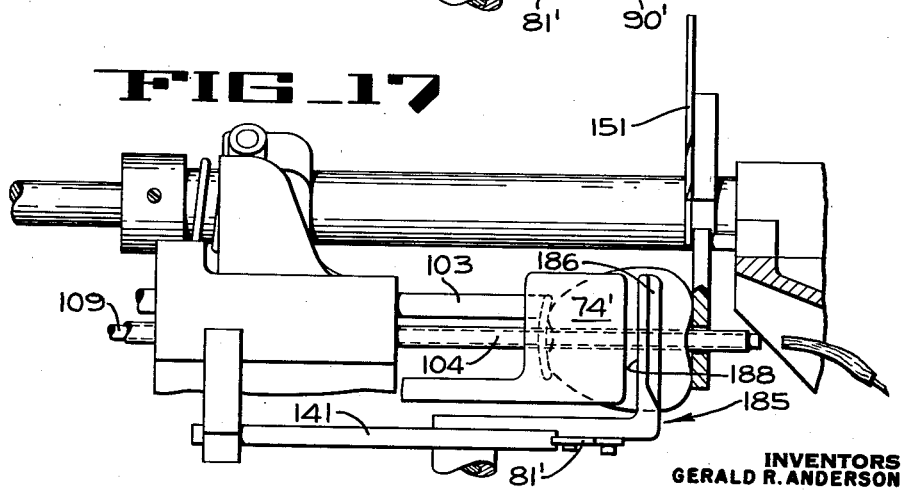

United States Patent Office 3,111,972
Patented Nov. 26, 1963

3,111,972
FRUIT PREPARATION MACHINE
Gerald R. Anderson, Campbell, Sherman H. Creed, San Jose, and Ralph G. Gardiner, Santa Clara, Calif., assignors to FMC Corporation, a corporation of Delaware
Filed Mar. 14, 1960, Ser. No. 14,789
17 Claims. (Cl. 146—81)

This invention appertains to a fruit preparation machine and more particularly relates to an apparatus for feeding fruit into a fruit preparation machine and for removing material from the stem end of fruit such as pears and apples.

One object of the present invention is to provide an improved apparatus for feeding fruit and removing the stem material therefrom.

Another object is to provide an improved fruit feed cup.

Another object is to provide an improved means for positively controlling the actuation of a fruit feed cup.

Another object is to provide apparatus adapted to remove the stem material from the fruit while the fruit is centered and locked in a feed cup and to cut off the stem end of the fruit while the fruit is supported by the stem material removing means.

Another object is to provide a stemming tube arranged to guide the tough stem fibers of a pear into the tube upon advance of the tube through the pear to assure more complete removal of the stem fibers.

Another object is provide an improved apparatus for positively maintaining the stem-blossom axis of a fruit in a fixed position while the stem is being cut from the fruit.

These and other objects and advantages of the present invention will become apparent from the following description and the accompanying drawings, in which:

FIG. 1 is a fragmentary perspective of a pear preparation machine incorporating the novel apparatus of the present invention and showing certain parts in a retracted position and other parts cut away.

FIG. 2 is a fragmentary perspective of the pear preparation machine of FIG. 1 with certain parts shown in an advanced or forward position and other parts cut away.

FIG. 3 is a diagrammatic perspective of the pear preparation machine of FIG. 1, particularly showing the power drive arrangement.

FIG. 4 is a fragmentary elevation of the pear preparation machine showing a portion of the drive arrangement in greater detail.

FIG. 5 is a diagrammatic vertical section of the turret end of the machine, taken along line 5—5 of FIG. 1 on a reduced scale.

FIG. 6 is an elevation of one of the improved feed cups of the present invention.

FIG. 7 is an enlarged perspective of the forward side of one of the improved feed cups of FIG. 6, said cup being shown in the latched position and being adapted for handling pears.

FIG. 8 is a perspective of the rear of the cup of FIG. 7, said cup being shown in the unlatched position.

FIGS. 9–12 are operational views showing successive steps in the processing of pears by the apparatus of the present invention.

FIG. 13 is an elevation of a portion of the machine, the view being taken in the direction indicated by the arrows 13—13 in FIG. 5 and showing the mechanism for moving the cup latch arm into the latched position.

FIG. 14 is a central longitudinal section of a pear showing the manner in which the hard stem fibers of the pear are pulled into the stemming tube.

FIG. 15 is an elevation of a feed cup adapted for use with apples.

FIGS. 16 and 17 are operational views showing the successive steps in the operation of the apparatus when using the modified apple-receiving cup.

The improved feeding and stem removing apparatus 20 (FIGS. 1 and 2) of the present invention is adapted for use in a machine 21 of the type disclosed in the United States Letters Patent No. 2,905,216, which issued to Freeman et al. on September 22, 1959 and in the type of machine disclosed in the application of Sherman H. Creed et al., Serial No. 715,805, now U.S. Patent No. 2,984,274. Since many of the parts of the machine 21 are identical to those disclosed in the Freeman et al. patent, only those parts of the machine 21 which are pertinent to the apparatus of the present invention will be described in detail.

The machine 21, in general, comprises a rigid base 22 upon which are mounted opposite end standards 23 and 24. A turret 26 (FIGS. 3 and 5) journalled in the end standard 24 is fixed to a horizontal shaft 28 which extends longitudinally of the machine 21 and is journalled in the end standards 23 and 24. A transmission 29 (FIG. 3) interconnects the shaft 28 and a motor 30 so that the turret 26 will be intermittently rotated in one-sixth of a revolution increments in the direction indicated by the arrow 31 (FIGS. 3 and 5).

A reciprocable carriage 32 which includes a cylindrical cam 33 is slidably mounted on a sleeve 34 which is journalled on the shaft 28. A gear 36 of the transmission 29 and a cam follower 37 (FIG. 2) are secured to the sleeve 34 and are driven one revolution for each one-sixth of a revolution of the shaft 28. The cam follower 37 rides in a cam slot 39 in the cam 33 and causes the carriage 32 to reciprocate longitudinally of the shaft 28 once for each intermittent movement of the turret 26.

As best shown in FIG. 3, the turret 26 carries six equally spaced fruit supporting rods 40, and teeth 41 formed on the periphery of the turret 26 mesh with the teeth 42 of a gear 43. The gear 43 of a feeding mechanism 44 (FIGS. 1 and 2) is driven by the turret 26 through two revolutions for each revolution of the turret. The gear 43 is journalled on a stationary shaft 46 and is coupled to a sleeve 47 which is also journalled on the shaft 46. The shaft 46 is fixed to and extends between the end standards 23 and 24. Three improved cup assemblies 48 of the present invention are pivotally secured to and are equally spaced around the sleeve 47.

The turret 26 is angularly indexed in one-sixth of a revolution increments, and the feeding mechanism 44 is consequently indexed in one-third of a revolution increments. A cup assembly 48 disposed at the feed station X (FIG. 5) will receive a pear stem end down and will be shifted by the first indexing to an impaling station Y at which station, according to the teaching of the present invention, the axis of the pear is disposed parallel to the shaft 28 and the pear is stemmed and the stem end of the pear is cut off. The pear is then indexed to transfer station Z where the pear is transferred from its cup assembly 48 to one of the six supporting rods 40, which rod is aligned with the axis of the pear. During the next indexing movement of the feeding mechanism 44, the cup assembly 48 returns to station X to receive another pear from the operator. The stemmed and trimmed pear is then carried by the turret 26 through succeeding stations where it is peeled, split, cored, and trimmed by mechanism that does not constitute a part of the present invention.

More particularly, each of the improved cup assemblies 48 (FIGS. 6, 7 and 8) comprises a pair of upper jaw arms 51 and 52 journalled on stub shafts 53 and 54 that are secured to a plate 56 as by welding. Meshing pinions 57 and 58 (FIG. 6) on the arms 51 and 52, respectively, will assure that the arms will be pivoted equal amounts in opposite directions. Each of two tension springs 59 is connected between one of two pins 61 secured to the plate 56 and one of two pins 62, each pin 62 being secured to one of the arms 51 or 52. The springs 59 urge the lower ends of the arms towards each other.

A pair of lower jaw arms 63 and 64 (FIG. 6) are journalled on stub shafts 66 and 67, respectively, and are provided with meshing pinions 68 and 69, respectively, which assure equal and opposite pivotal movement of the arms 63 and 64. Two tension springs 71 are provided and each spring 71 is connected between one of two pins 72 secured to the plate 56 and one of two pins 73, one being secured to each of the lower arms 63 and 64. The above described portion of each cup assembly 48 is substantially the same as that disclosed in the Freeman et al. patent and the structure for shifting the cup assemblies from the vertical position at station X to the horizontal position at stations Y and Z is the same as that disclosed in the Freeman et al. patent and therefore will not be repeated.

The improvement in the cup assemblies 48 resides in the shape of the fruit gripping jaws and the structure for controlling the actuation of the lower jaw arms 63 and 64. The upper jaws 74 and 76 are substantially in the form of cylindrical segments and are secured to the lower ends of the upper jaw arms 51 and 52, respectively. The upper jaws 74 and 76 are urged by the springs 59 against the large, generally cylindrical surface of the blossom end portion of the pear. The lower jaws 77 and 78 are secured to the lower ends of the arms 63 and 64, respectively, and when held together as shown in FIG. 7, define a frusto-conical centering chamber 79. The stem end portion of the pear is placed in the frusto-conical chamber 79 with the stem and a small amount of the end portion of the pear projecting from the small end of the chamber 79 as shown in FIG. 9. This frusto-conical configuration of the chamber assures a better centering of the stem end of the pear.

As indicated in FIG. 8, a latch arm 81 is provided to control the actuation of the lower jaw arms 63 and 64 by latching them together when the cup assemblies 48 are at station X (FIG. 5) and while the stemming operation is being performed at station Y. The latch arm 81 is pivotally connected to the lower jaw arm 64 at 82 (FIG. 8) and includes a locking slot 83 arranged to receive a pin 84 which is secured to the arm 63 to lock the arms 63 and 64 together. A pin 86 is secured to the arm 64 and extends through a slot 87 in the latch arm 81. A spring 88 is connected to the pin 86 and to a pin 89 secured to one end of the latch arm 81. The pins 86 and 89 are so positioned relative to the pivot point 82 as to define an overcenter lock when interconnected by the spring. Thus, the latch arm will remain in either its latched or unlatched position until it is moved from this particular position by external means soon to be described. An eccentric disc 90 which is bolted to the lower jaw arm 64 in position to be contacted by the latch arm 81, serves as adjustable means limiting the movement of the latch arm 81 relative to the lower jaw arm 64. The disc 90 can be adjusted so that the means which unlatches the lower jaws 77 and 78 also will positively open these jaws.

As already mentioned, the upper jaws 74 and 76 of each cup assembly 48 are urged towards each other by the springs 59. The upper jaws 74 and 76 are positively opened to facilitate feeding of the pear into the latched lower jaws 77 and 78 when each assembly is at station X. For this purpose, the arm 52 of each assembly 48 is provided with an extension 91 having a cam follower 92 journalled thereon. Each cam follower 92 engages the beveled end of an adjustable cam bar 93 (FIG. 6) shortly before the cup assembly 48 reaches station X to spread the upper jaws 74 and 76 as shown in FIG. 2. The adjustable cam bars 93 are bolted to the sleeve 47 adjacent their associated cup assembly 48.

The aforementioned reciprocable carriage 32 (FIGS. 1, 2, 3 and 4) includes the cylindrical cam 33 and a bracket 101 (FIGS. 3 and 4) secured to the cam 33. A guide block 102 is bolted on an upstanding leg 101a (FIG. 4) of the bracket 101 and is bored to slidably receive a fruit seater or pusher 103 and a stemming tube 104. The fruit seater 103 includes a fruit seating shoe 105 provided with an opening 106 (FIG. 3) which is concentric with the axis of the stemming tube 104 and with the longitudinal axis of a pear when it is held in one of the cup assemblies 48 at station Y. A stem end gauge 107 (FIG. 1) is secured to the end standard 24 and is also provided with an opening 108 which is concentric with the stemming tube 104. A stem ejecting rod 109 (FIG. 4) is slidably received in the stemming tube 104 and has an enlarged head 111 on one end thereof.

A fruit seater actuating lever 112 (FIGS. 3 and 4) is pivotally mounted on a hub 101b extending rearwardly from the bracket 101 and is connected to the fruit seater 103 by a link 113 which includes a pin 114 (FIG. 4) that projects laterally through the fruit seater 103. A limit bolt 116 is screwed into the guide block 102 and serves to limit the extent of movement of the lever 112 towards the block 102. A tension spring 117 is secured to the lever 112 and to an angle bar 118 screwed into the bracket 101 and serves to resiliently urge the fruit seater 103 toward the right as viewed in FIG. 2.

The stemming tube 104 (FIG. 1) is moved toward and away from a pear, held in a cup 48 at station Y, by means of a bell crank 121 which is pivotally connected to the bracket 101 by a stub shaft 122 and has a yoke 123 on its upper end which is slotted to engage pins 124 (only one being shown) which extend laterally outward from opposite sides of a collar 126 secured to the stemming tube 104. A cam follower 127 is journalled on the lower end of the bell crank 121 and rides in a cam slot 128 (FIG. 2) formed in the inner face of a plate 129 secured by capscrews 130 to the stationary shaft 46. The cam slot 128 has a raised portion 128a which causes the bell crank to pivot and causes the stemming tube 104 to move forwardly in the guide block 102, and through the pear and the holes in the fruit seater shoe 105 and in the stem end gauge 107 when the carriage 32 is moved forward, i.e., to the right end (FIGS. 1 and 2) of its stroke. As the stemming tube 104 passes through the pear, the stem material entering the tube 104 momentarily prevents forward movement of the stem ejecting rod 109.

A stem ejector lever 131 (FIGS. 1 and 2) is pivotally mounted on the bracket 101 by a stub shaft 132 and is resiliently connected to the bell crank 121 by a tension spring 133. The upper end 134 of the lever 131 is pivotally connected to the head 111 (FIG. 4) of the ejector rod 109 by a link 135, and the lower end 136 (FIGS. 1 and 2) of the lever 131 is disposed in position to engage a fixed abutment bolt 137. The bolt 137 is screwed into a bracket 138 which is bolted to the plate 129. The bolt 137 is adjusted so that the lower end 136 of the lever 131 will contact the bolt 137 immediately before the carriage 32 reaches the forward end of its stroke, i.e., to the right in FIGS. 1 and 2. When the carriage 32 reaches the forward end of its stroke, the bolt 137 causes the upper end 134 of the lever 131 to move the stem ejecting rod through the stemming tube 104 thereby forcing the stem material from the stemming tube 104. A similar abutment bolt 139 is mounted on a bracket 140 welded to the plate 129 and is contacted by the lower end 136 of the lever 131 adjacent the other end of its stroke to move the ejecting rod 109 rearwardly within the stemming tube 104 to minimize the tendency for material to become wedged between the rod 109 and the tube 104.

Shortly before the carriage 32 reaches the right end (FIGS. 1 and 2) of its stroke, and after the stemming tube has passed through the pear, the latch arm 81 of the feed cup is engaged and moved to an unlatched position by a threaded rod 141 which moves with the stemming tube, being locked by nuts 143 to an arm 142 projecting laterally from the guide block 102. The fruit seater 103 then pushes the fruit along the stemming tube 104, as indicated in FIG. 11, until the pear is firmly held against the stem end gauge 107. Since the fruit seater 103 is slidably mounted in the guide block 102 and is resiliently urged toward the pear by the spring 117, the seater is self-adjusting for fruit of diffeernt lengths.

Upon retraction of the carriage 32, the stemming tube 104 and the stem ejecting rod 109 are moved to the position shown in FIG. 12, and a knife 151 is actuated to sever the stem end from the body of the pear. The knife 151 (FIGS. 1 and 2) is bolted to a block 151 which is welded to a sleeve 153 that is journalled on a shaft 154. The shaft 154 is journalled in the end standards 23 and 24 and is pivoted by knife drive means (not shown) which are fully disclosed in the Freeman et al patent. The shaft 154 is pivoted a sufficient amount to move the knife 151 from the FIG. 2 position to the lowered position of FIG. 12 wherein the end of a fruit is severed from its body each time the carriage 32 reaches the forward end of its stroke. In order to prevent the knife 151 from cutting into the fruit before the stemming tube has been withdrawn from the cutting plane, and in order to perform a more forceful and rapid actuation of the knife 151, a knife delaying cam 156 (FIG. 12) is provided. The knife delaying cam 156 is secured to and reciprocates with the guide block 102 and includes a horizontal delaying surface 156a and a sharply inclined surface 156b which cooperate with a cam follower 157 that is journalled on a bracket 158 secured to the sleeve 153. A collar 159 (FIG. 1) is locked on the shaft 154 adjacent one end of the sleeve 153 and has a finger 161 welded thereon which has an end portion disposed behind the rear edge of the bracket 158 to prevent downward movement of the knife 151 when the finger 161 is positioned as shown in FIG. 1. A torsion spring 162 is connected at one end to the collar 159 and at the other end to the bracket 158 and serves to urge the knife 151 downwardly.

When the carriage 32 reaches the forward end of its stroke as shown in FIG. 11, the knife driving means (not shown) has rotated the shaft 154 in a direction to swing the finger 161 away from bracket 158 and to stress the torsion spring 162 sufficiently to ordinarily move the knife through the fruit. However, the cam follower 157 at this time rides against the horizontal surface 156a of the cam 156 thereby preventing the knife 151 from swinging down through the pear. As the carriage 32 is retracted, the cam follower 157 moves off the horizontal surface 156a and rapidly moves down the inclined surface 156a causing the knife 151 to swing down and sever the stem end from the pear as indicated in FIG. 12. After cutting through the pear, the knife 151 is stopped when the bracket 158 contacts the finger 161. As the carriage 32 moves to its rearward, retracted position, the knife drive means (not shown) rotates the shaft 154 in the opposite direction, thereby raising the knife 151. When the carriage is moving towards the retracted position, the stemming tube 104 and the stem ejecting rod are withdrawn from within the pear, and the rod 141 is moved away from the latch arm 81.

The feeding mechanism 44 (FIGS. 3 and 5) is then indexed to move the cup assembly 48, which supports the pear that has had its stem end and stem material removed therefrom, into station Z. During the next forward movement of the carriage 32 another pear in the cup assembly 48 at station Y is stemmed and trimmed, and the pear at station Z is engaged by a pusher 165 (FIGS. 3 and 13) that is secured to the carriage 32. The pusher 165 slides the pear through its supporting cup assembly 48, which has its lower jaws 77 and 78 unlatched, and onto the fruit supporting rod 40 that is aligned therewith.

As shown in FIG. 13, when the carriage 32 moves forward at station Z, the latch arm 81 of the feed cup is engaged by flared ends 166 and 167 of two complementary leaf springs 168 and 169, respectively, of a relatching device 170. The springs 168 and 169 have portions 171 and 172 which contact each other adjacent their flared ends 166 and 167 and then again flare outwardly as at 173. The other end portions 174 and 176 are reinforced by leaf springs 177 and 178 and are bolted to a bracket 179 which is bolted to the carriage 32. As the springs move against the latch arm 81, the portions 171 and 172 spread, allowing the arm 81 to move therepast into a space 181 between the portions 174 and 176. Upon movement of the carriage 32 toward the retracted position, the latch arm 81 is pivoted by the contacting portions 171 and 172 into latching position. The leaf springs 168 and 169 are then pulled away from the arm.

In the operation of the feeding and stem removing apparatus of the present invention, the progress of one pear through the apparatus will be followed. A pear is placed stem end down into the centering chamber 79 (FIGS. 1 and 2) of the cup assembly 48 at station X. While at station X, the upper jaws 74 and 76 are held open by engagement of the cam follower 92 with the adjustable cam bar 93, and the lower jaws are locked together by the arm 81. With the cup assembly 48 in this condition, an operator can rapidly insert a pear into the cup assembly 48 without fear of forcing the pear too far into the cup and causing the lower jaws 77 and 78 to separate. Such a condition, if permitted, might result in the stem end of the pear contacting the stem end gauge 107 when the assembly is indexed to station Y resulting in misalignment and permanent injury to the pear.

As the assembly is indexed to station Y, the cam follower 92 rolls off the cam bar 93 causing the upper jaws 74 and 76 to resiliently close against the large diameter portion of the pear thereby centering the pear in the cup assembly 48. Shortly after arriving at station Y, the parts are positioned as shown in FIG. 7. As the carriage 32 moves toward the fruit, the concave fruit seater shoe 105 contacts and resiliently but firmly urges the pear into the frusto-conical centering chamber 79 to accurately center the pear, that is, align the longitudinal axis of the pear with the axis of the stemming tube 104.

With the lower jaws of the cup assembly 48 still latched together, the stemming tube 104 is thrust through the pear as shown in FIG. 10 by the continued forward movement of the carriage 32 aided by the pivotal movement of the bell crank 121 (FIG. 2) as the cam follower 127 moves onto the raised portion 128a of the cam slot 128. Since the tube 104 enters the blossom end of the pear and since the blossom end of the pear is generally symmetrical about its longitudinal axis, while the stem end may be bent from the axis as shown in FIG. 14, the hard stem fibers are guided into the stemming tube 104 and pulled from the body of the pear as the tube is advanced through the pear. Also, since the stemming tube 104 is thrust through the pear before the pear engages the stem end gauge 107, there is no tendency for a pear with an off-center stem end to shift and become misaligned.

Immediately before the carriage reaches the forward end of its stroke, the rod 141 engages and actuates the latch arm 81 to unlock the lower jaws permitting the resilient energy in the spring 117 (FIG. 2) to pivot the lever 112 which causes the fruit seater 103 to seat the stemmed pear against the stem end gauge 107. Concurrently with the above, the lower end 136 of the lever 131 contacts the abutment bolt 137 to force the stem ejecting rod 109 through the stemming tube 104 to eject the stem material from the tube 104 as shown in FIG. 11. The shaft 154 is pivoted at this time to resiliently tension the spring 162 which tends to actuate the knife 151. The knife 151 is not permitted to trim the stem end from the pear until the carriage is retracted a sufficient amount to move the cam follower 157 (FIG. 12) off the horizontal portion 156a of the knife delaying cam 156 and to withdraw the stemming tube 104 from the plane of the knife 151. As the cam follower 157 moves off the horizontal portion 156a and down the inclined portion 156b, the spring 162 rapidly drives the knife through the stem end of the pear. Since the stemming tube 104 remains imbedded in the pear as the knife 151 cuts through the pear, the knife 151 cannot cause the pear to become misaligned.

Upon complete retraction of the carriage 32, the different parts assume the position shown in FIG. 1, and the cup assembly 48 carrying the stemmed and trimmed pear, is indexed to station Z. Upon the next forward stroke of the continuously reciprocating carriage 32, the pusher 165 (FIG. 13) engages the pear and pushes it out of the unlatched cup assembly 48 onto one of the fruit supporting rods 40. As the carriage moves toward the retracted position, the relatching device 170 (FIG. 13) again latches the arm 81 thereby locking the lower jaws 77 and 78 of the cup assembly 48 together before the assembly is returned to station X.

Apple cup assemblies 185 (FIGS. 15, 16 and 17) may be mounted on the machine 21 (FIG. 1) in place of the pear cup assemblies 48 when it is desired to process apples. Since many of the parts of the apple cup assemblies 185 are equivalent to parts in the pear cup assemblies 48, these equivalent parts of the assemblies 185 will be assigned the same numerals as those in the assemblies 48 followed by a prime (') suffix. The apple cup assemblies 185 are the same as the pear cup assemblies except that the lower jaws 186 and 187 have flat apple contacting surfaces 188 and 189, respectively, which surfaces lie in a plane normal to the longitudinal axis of the stemming tube 104 when the lower jaws are locked closed by the latch arm 81' at station Y. Since the stem end of an apple is usually normal to its longitudinal axis, the longitudinal axis of the apple is aligned with the stemming tube 104 when the apple is gripped by the upper jaws 74' and 76', and is forced against the surfaces 188 and 189 by the fruit seater 103. The apple is cored by the tube 104, the stem material is ejected by the stem ejector rod 109 and the stem end of the apple is trimmed by the knife 151 in the same way as these operations are performed with pears. It should be noted, however, that the lower jaws 186 and 187 must be completely opened when the carriage reaches the forward end of its stroke since the lower jaws are flat, and forcing the apple against the jaws 186 and 187 has little tendency to separate the jaws. The jaws 186 and 187 are first unlatched by engagement of the rod 141 with the latch arm 81' and then, further forward motion of the rod 141 forces the arm against the eccentric disc 90' thereby positively opening the jaws 186 and 187.

From the foregoing description, it is apparent that the present invention provides an improved feeding and stem removing apparatus wherein the fruit is more effectively centered with the aid of a set of lower cup jaws which are locked together. The movement of the stemming tube through the first from the blossom end to the stem end causes the tube to effectively guide the hard stem fibers of the fruit into the tube resulting in a more complete removal of the stem fibers from the fruit while the fruit is held in centered position in the feed cup assures that the fruit will not move sidewise during this operation.

While two embodiments of the present invention have been shown and described, it will be understood that various changes and modifications may be made without departing from the spirit of the invention or the scope of the appended claims.

The invention having thus been described, what is believed to be new and desired to be protected by Letters Patent is:

1. An apparatus for processing fruit comprising oppositely disposed jaws for supporting a fruit and resisting movement of the fruit, means mounting said jaws for movement toward and away from each other, releasable jaw holding means movable between a position holding said jaws together during a fruit impaling operation and a position releasing said jaws for movement, means cooperating with said jaws to center a fruit supported thereby while said jaws are held together, a stemming tube disposed in alignment with the stem-blossom axis of the fruit when centered relative to said jaws, and means for forcing said stemming tube through said fruit from the blossom end to the stem end while the fruit is being held by said jaws.

2. An apparatus for processing fruit comprising oppositely disposed jaws for supporting a fruit, means mounting said jaws for movement toward and away from each other, means urging said jaws toward each other, latching means movable between a position latching said jaws together and a position releasing said jaws for movement, means cooperating with said jaws to center a fruit supported thereby while said jaws are latched together, a stemming tube disposed in alignment with the stem-blossom axis of the fruit when centered relative to said jaws, means for moving said stemming tube through the fruit and thereafter withdrawing said tube from the fruit, and means for severing the stem end from the fruit while the fruit is supported on said stemming tube and during withdrawal movement of said stemming tube from the fruit.

3. An apparatus for processing fruit comprising oppositely disposed jaws for supporting and resisting movement of a fruit, means mounting said jaws for movement toward and away from each other, resilient means urging said jaws toward each other, latching means movable between a position latching said jaws together and a position releasing said jaws for movement, means cooperating with said jaws to center a fruit supported thereby while said jaws are latched together, a stemming tube disposed in alignment with the stem-blossom axis of the fruit when centered relative to said jaws, a stem end gauge disposed in alignment with said stemming tube and spaced from the fruit when said jaws are latched, means for reciprocating said stemming tube through the fruit and thereafter for withdrawing said tube from the fruit, means for unlatching and opening said jaws after said stemming tube has moved through the fruit, resiliently actuated means for moving the fruit longitudinally between said opened jaws and into contact with said stem end gauge, a knife disposed adjacent said end gauge in position to cut through the stem end of the fruit, and resilient means for urging said knife through the stem end of the fruit as said stemming tube is being withdrawn from the fruit.

4. An apparatus for processing fruit comprising oppositely disposed jaws which define a centering chamber for supporting and aligning a fruit disposed between said jaws, means mounting said jaws for movement toward and away from each other, resilient means urging said jaws toward each other to align and grip the fruit therein, latching means movable between a position latching said jaws together and a position releasing said jaws for movement, a stemming tube disposed in alignment with the stem-blossom axis of the fruit when aligned in said centering chamber, a stem end gauge disposed in a plane extending laterally of said stemming tube and being spaced from said fruit when said jaws are latched, means for forcing said stemming tube through said fruit from the blossom end to the stem end while the fruit is being held by said latched jaws, and means for unlatching said jaws and sliding the impaled fruit through said jaws into contact with said stem end gauge.

5. An apparatus for processing fruit comprising oppositely disposed upper jaws and lower jaws which define a centering chamber for supporting and aligning a fruit disposed between said jaws, means mounting said upper jaws and said lower jaws for movement toward and away from the fruit supported thereby, resilient means urging said jaws against said fruit to align the fruit in said centering chamber, latching means movable between a position latching said lower jaws together and a position releasing said jaws for movement, a fruit seater arranged to engage the blossom end of the fruit and having an opening therein in alignment with the stem-blossom axis of the fruit, resilient means connected to said fruit seater for firmly urging said seater against the fruit to urge the fruit into said centering chamber, a stemming tube disposed in alignment with the stem-blossom axis of the fruit when aligned in said centering chamber, a stem end gauge disposed in a plane extending laterally of said stemming tube and being spaced from said fruit when said lower jaws are latched, said stem end gauge having an opening aligned with said stemming tube, means for forcing said stemming tube through the openings in the fruit seater and in the stem end gauge and through said fruit from the blossom end to the stem end while the fruit is being held by said latched lower jaws, and means for unlatching said lower jaws after said stemming tube has passed through the fruit allowing said last mentioned resilient means to force said fruit between said jaws.

6. In an apparatus for processing fruit, a fruit support member having fruit-contacting portions formed symmetrically around an axis for supporting a fruit with its stem-blossom axis in a predetermined position and coincident with the axis of said fruit support member, a stemming tube positioned in alignment with said axis and having a free end, first actuating means connected to said stemming tube for sequentially forcing said stemming tube into the blossom end of the fruit while the fruit is held by said fruit support member and through said fruit to sever the hardened stem material therefrom and thereafter withdrawing said tube from the fruit, stem ejecting means within said stemming tube for discharging the severed stem material from the fruit and from within the stemming tube prior to the withdrawal of said tube from the fruit, second actuating means for actuating said stem ejecting means, means disposed in a cutting plane transversely of said stemming tube for cutting through the stem end of the fruit transversely of said axis while the stemming tube is being withdrawn from the fruit and while its free end is disposed near the cutting plane, resilient actuating means operatively connected to said cutting means for actuating said cutting means after the stem material has been removed from the fruit, and timing means for operating said first actuating means, said second actuating means and said resilient actuating means in timed relation.

7. In an apparatus for processing fruit, a fruit support member having fruit contacting surfaces formed symmetrically around an axis for supporting a fruit with its stem-blossom axis in a predetermined position and coincident with the axis of said fruit support member, a stemming tube disposed adjacent to and aligned with said axis, first actuating means connected to said stemming tube for forcing said stemming tube into the blossom end of the fruit while the fruit is held by said fruit support member and through said fruit to sever the hardened stem material therefrom and thereafter withdrawing said tube from the fruit, stem ejecting means within said stemming tube for discharging the severed stem material from the fruit and from within the stemming tube prior to the withdrawal of said tube from the fruit, second actuating means for actuating said stem ejecting means, cutting means disposed in a cutting plane transversely of said stemming tube for cutting through the stem end of the fruit transversely of said axis while the stemming tube is being withdrawn from the fruit and while its free end is disposed near said cutting plane, resilient actuating means operatively connected to said cutting means for resilient energizing said cutting means when said stemming tube is being forced through the fruit, cam means operatively connected to said resilient means for maintaining said resilient means energized and for delaying the movement of said cutting means through the fruit until said stemming tube has been withdrawn past said plane, and timing means for operating said first actuating means, said second actuating means and said cam means in timed relation.

8. In an apparatus for processing fruit, means for supporting a fruit with its stem-blossom axis in a predetermined position, a carriage mounted for reciprocable movement toward and away from said supporting means in a path parallel to said stem-blossom axis, a stemming tube carried by said carriage and arranged to be reciprocated thereby to move into the blossom end of the fruit and through said fruit when the carriage is moved toward said supporting means and to thereafter withdraw from said fruit when said carriage is moving away from the fruit, a knife energizing shaft positioned adjacent said supporting means and disposed parallel to said axis, a sleeve journalled for rotation on said shaft, a knife secured to said sleeve for cutting through the stem end of the fruit in a plane extending laterally of said axis, a bracket secured to and projecting outwardly from said sleeve and having a rear edge, a cam follower carried by said bracket, a collar secured to said shaft adjacent said bracket, a finger secured to said collar and projecting therefrom into position to be contacted by said rear edge, a torsion spring connected between said bracket and said collar, a cam carried by said carriage and having a raised knife-delayed camming surface and a sharply inclined knife-controlling surface, and means for rotating said shaft when said cam follower is disposed against said knife-delaying surface to move said finger away from said rear edge and to resiliently tension said spring, said cam follower being arranged to move from said delaying surface to said inclined knife-controlling surface after said stemming tube has been retracted past the plane of said knife thereby allowing said knife to be resiliently urged through the stem end of the fruit.

9. In an apparatus for processing fruit, means for supporting a fruit with its stem-blossom axis in a predetermined position, a carriage mounted for reciprocating movement toward and away from said supporting means in a path which is parallel to said stem-blossom axis, a stemming tube carried by said carriage and aligned with said axis, a bell crank pivotally mounted on said carriage and connected at one end to said stemming tube, a cam follower journalled on the other end of said bell crank, a stationary cam disposed in position to engage said cam follower and having an inclined portion, and means for reciprocating said carriage to move said cam follower along said cam and up said inclined portion whereby said stemming tube is forced through the fruit from the blossom end to the stem end of the fruit.

10. In an apparatus for processing fruit, means for supporting a fruit with its stem-blossom axis in a predetermined position, a carriage mounted for reciprocating movement toward and away from said supporting means in a path which is parallel to said stem-blossom axis, a stemming tube carried by said carriage and aligned with said axis, a bell crank pivotally mounted on said carriage and connected at one end to said stemming tube, a cam follower journalled on the other end of said bell crank, a stationary cam disposed in position to engage said cam follower and having an inclined portion, means for cutting through the stem end of the fruit in a plane extending laterally of said axis, means for resiliently energizing said cutting means when said stemming tube is being forced through said fruit, and means for delaying actuation of said cutting means through the fruit until said stemming tube has been withdrawn past said plane.

11. In an apparatus for processing fruit, means for supporting a fruit with its stem-blossom axis in a predetermined position, a carriage mounted for reciprocable movement toward and away from said supporting means in a path which is parallel to said stem-blossom axis, a stemming tube carried by said carriage and aligned with said axis, a bell crank pivotally mounted on said carriage and connected at one end to said stemming tube, a cam follower journalled on the other end of said bell crank, a stem ejecting rod slidably received in said stemming tube, a lever pivotally mounted on said carriage and connected at one end to said stemming tube, means resiliently connecting said lever to said bell crank, a stationary cam disposed in position to engage said cam follower and having an inclined portion, a fixed abutment secured to said cam and disposed in position to be engaged by said lever when said lever is at the foremost end of its travel, and means for reciprocating said carriage to move said cam follower along said cam and up said inclined portion as the carriage approaches the foremost end of its travel whereby said stemming tube is forced through the fruit from the blossom end to the stem end of the fruit, and to move the other end of said lever against said abutment as said carriage reaches the foremost end of its stroke to actuate said stem ejecting rod and push the stem material out of said stemming tube.

12. In an apparatus for processing fruit the combination of a cup assembly having pivotally mounted complementary jaws which define a frusto-conical fruit centering chamber when held together, means resiliently urging said jaws together, means for latching said jaws together, a concave fruit seating shoe disposed in position to engage the blossom end of the fruit, said shoe having an opening therein concentric with the axis of said frusto-conical chamber, means for resiliently urging said shoe against the fruit to firmly force and center the fruit in said frusto-conical chamber, a stemming tube disposed in alignment with the axis of said frusto-conical chamber, means for forcing said stemming tube through the fruit while said jaws are latched, and means for unlatching said jaws after said stemming tube has penetrated said fruit to allow said shoe to move the fruit between said jaws to separate said jaws.

13. In an apparatus for processing fruit, a feeding mechanism comprising, a pair of complementary upper cup jaws, means for intermittently moving said jaws in a circular path in 120° increments to carry said jaws from a feed station to an impaling station to a discharge station and back to said feed station, means for resiliently urging said jaws together, a pair of complementary lower cup jaws which define a frusto-conical centering chamber, means for resiliently urging said lower jaws together, means for latching said lower jaws together while said lower jaws are disposed in the feed station wherein the axis of said frusto-conical chamber lies in a vertical plane and while said jaws are disposed in the impaling station with the axis of said frusto-conical chamber disposed in a horizontal plane, means for shifting the axis of said chamber from a vertical to a horizontal position as said mechanism is indexed from the feed station to the impaling station, a stemming tube disposed in axial alignment with the axis of said frusto-conical chamber when said jaws are positioned at the impaling station, means for forcing a fruit into said frusto-conical chamber to center the fruit when said lower jaws are latched and are disposed at said impaling station, and means for forcing said stemming tube through the fruit centered in said jaws from the blossom end to the stem end of the fruit while said lower jaws are latched.

14. In an apparatus for processing fruit, a feeding mechanism comprising a pair of complementary upper cup jaws, means for intermittently moving said jaws in a circular path in 120° increments to carry said jaws from a feed station to an impaling station to a discharge station and back to said feed station, means for resiliently urging said jaws together, a pair of complementary lower cup jaws which define a frusto-conical centering chamber, means for resiliently urging said lower jaws together, means for latching said lower jaws together while said lower jaws are disposed in the feed station wherein the axis of said frusto-conical chamber lies in a vertical plane and while said jaws are disposed in the impaling station with the axis of said frusto-conical chamber disposed in a horizontal plane, means for shifting the axis of said chamber from a vertical to a horizontal position as said mechanism is indexed from the feed station to the impaling station, a stemming tube disposed in axial alignment with the axis of said frusto-conical chamber when said jaws are positioned at the impaling station, means for forcing said stemming tube through a fruit centered in said jaws from the blossom end to the stem end while said lower jaws are latched, and means for unlatching said lower jaws at the impaling station after said stemming tube has passed through the fruit.

15. In an apparatus for processing fruit, a feeding mechanism comprising, a pair of complementary upper cup jaws, means for intermittently moving said jaws in a circular path in 120° increments to carry said jaws from a feed station to an impaling station to a discharge station and back to said feed station, means for resiliently urging said jaws together, a pair of complementary lower cup jaws which define a frusto-conical centering chamber, means for resiliently urging said lower jaws together, means for latching said lower jaws together while said lower jaws are disposed in the feed station wherein the axis of said frusto-conical chamber lies in a vertical plane and while said jaws are disposed in the impaling station with the axis of said frusto-conical chamber disposed in a horizontal plane, means for shifting the axis of said chamber from a vertical to a horizontal position as said mechanism is indexed from the feed station to the impaling station, a stemming tube disposed in axial alignment with the axis of said frusto-conical chamber when said jaws are positioned at the impaling station, means for inserting said stemming tube through a fruit centered in said jaws from the blossom end to the stem end while the lower jaws are latched and thereafter for withdrawing said tube from the fruit, means for unlatching said lower jaws at said impaling station after said stemming tube has passed through the fruit, means for trimming the stem end of the fruit while said fruit is supported on said stemming tube, a fruit supporting rod disposed in alignment with the axis of said chamber at the discharge station, and means for transferring the stemmed and trimmed fruit from said pairs of jaws onto said fruit supporting rod at the discharge station.

16. In an apparatus for processing fruit, a feeding mechanism arranged to be intermittently indexed between a feed station, an impaling station, and a transfer station comprising, a cup assembly movable into each of said stations in turn and having complementary jaws centered about an axis, means operable to latch said jaws together while in said feed station and while in said impaling station, means at said impaling station for resiliently urging the fruit into a centered condition in said cup assembly, a stemming tube aligned with said axis at said impaling station, means for inserting said stemming tube through and withdrawing said stemming tube from the fruit while disposed at the impaling station, means for unlatching said jaws after said stemming tube has been moved through the fruit, a fruit support rod aligned with said cup at the transfer station, and means at said transfer station for transferring the whole, stemmed fruit from said cup assembly onto the fruit support rod.

17. In an apparatus for processing fruit a cup assembly comprising a support plate, a pair of complementary upper jaws pivotally mounted on said plate for equal movement toward and away from each other, a pair of complementary lower jaws disposed below and in alignment with said upper jaws and mounted on said plate for equal movement toward and away from each other, means for resiliently urging said upper jaws toward each other and for urging said lower jaws toward each other, a latch arm pivotally connected to one of said lower jaws and having a locking slot therein, a pin connected to said other jaw and positioned in said slot when said latch arm is moved to a latched position to latch said lower jaws together, resilient means arranged to hold said latch arm in adjusted position, and abutment means secured to the lower jaw which pivotally carries said latch arm, said abutment means being disposed in position to be engaged by said arm when said arm is unlatched.

References Cited in the file of this patent
UNITED STATES PATENTS

| | | |
|---|---|---|
| 2,447,640 | Dunn | Aug. 24, 1948 |
| 2,526,712 | Thompson | Oct. 24, 1950 |
| 2,742,067 | Coons et al. | Apr. 17, 1956 |
| 2,883,070 | Puccinelli et al. | Apr. 21, 1959 |
| 2,905,216 | Freeman et al. | Sept. 22, 1959 |
| 2,958,353 | Ogelvie | Nov. 1, 1960 |